(12) United States Patent
Bjäre et al.

(10) Patent No.: US 7,584,471 B2
(45) Date of Patent: *Sep. 1, 2009

(54) PLUG-IN MODEL

(75) Inventors: Björn Bjäre, Lund (SE); Chi Thu Le, Lund (SE); Jonas Hansson, Lund (SE); Henrik Svensson, Malmö (SE); Mikael Danielsson, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 611 days.

This patent is subject to a terminal disclaimer.

(21) Appl. No.: 10/665,834

(22) Filed: Sep. 19, 2003

(65) Prior Publication Data

US 2004/0098733 A1    May 20, 2004

Related U.S. Application Data

(60) Provisional application No. 60/412,902, filed on Sep. 23, 2002, provisional application No. 60/412,901, filed on Sep. 23, 2002, provisional application No. 60/412,769, filed on Sep. 23, 2002, provisional application No. 60/412,756, filed on Sep. 23, 2002.

(51) Int. Cl.
*G06F 9/445* (2006.01)

(52) U.S. Cl. .................................................. 717/178

(58) Field of Classification Search ............... 717/120, 717/171–178; 709/203, 206, 205, 220, 223–227; 719/328, 331, 324; 715/853, 513, 501.1; 370/270, 352; 455/435.1, 412.2
See application file for complete search history.

(56) References Cited

U.S. PATENT DOCUMENTS

| | | | |
|---|---|---|---|
| 3,831,148 A | 8/1974 | Greenwald et al. | |
| 5,689,565 A | 11/1997 | Spies et al. | |
| 5,771,240 A | 6/1998 | Tobin et al. | |
| 5,937,366 A | 8/1999 | Zbytniewski et al. | |
| 6,002,869 A | 12/1999 | Hinckley | |
| 6,044,408 A | 3/2000 | Engstrom et al. | |
| 6,049,896 A | 4/2000 | Frank et al. | |

(Continued)

FOREIGN PATENT DOCUMENTS

EP    0902596 A2    3/1999

(Continued)

OTHER PUBLICATIONS

U.S. Appl. No. 10/606,684, filed May 27, 2004, Moller et al.

(Continued)

*Primary Examiner*—Tuan Anh Vu
(74) *Attorney, Agent, or Firm*—Michael Cameron

(57) ABSTRACT

Method and system for extending and/or modifying functionality of a platform for a product, such as a mobile terminal for a wireless telecommunications system. The system includes a platform domain having a software services component for providing functionality, and an interface component having at least one interface for providing access to the software services component for enabling application software to be installed, loaded and run in said platform via the at least one interface. The system also includes plug-in software for use together with the application software for extending and/or modifying the functionality of the software services component of the platform domain via the at least one interface.

18 Claims, 7 Drawing Sheets

U.S. PATENT DOCUMENTS

| | | | |
|---|---|---|---|
| 6,052,524 | A | 4/2000 | Pauna |
| 6,061,709 | A | 5/2000 | Bronte |
| 6,105,154 | A | 8/2000 | Wang et al. |
| 6,112,312 | A | 8/2000 | Parker et al. |
| 6,137,802 | A | 10/2000 | Jones et al. |
| 6,269,396 | B1 | 7/2001 | Shah et al. |
| 6,279,124 | B1 | 8/2001 | Brouwer et al. |
| 6,317,659 | B1 | 11/2001 | Lindsley et al. |
| 6,353,897 | B1 | 3/2002 | Nock et al. |
| 6,389,491 | B1 | 5/2002 | Jacobson et al. |
| 6,802,061 | B1 * | 10/2004 | Parthasarathy et al. ...... 717/173 |
| 6,822,945 | B2 * | 11/2004 | Petrovykh .................... 370/270 |
| 6,895,430 | B1 * | 5/2005 | Schneider .................... 709/217 |
| 6,961,567 | B1 * | 11/2005 | Kuhn ........................ 455/435.1 |
| 7,020,697 | B1 * | 3/2006 | Goodman et al. ........... 709/223 |
| 7,069,562 | B2 * | 6/2006 | Kushnirskiy et al. ........ 719/328 |
| 7,210,099 | B2 * | 4/2007 | Rohrabaugh et al. ........ 715/249 |
| 2001/0015654 | A1 | 8/2001 | Habersetzer et al. |
| 2001/0039570 | A1 * | 11/2001 | Stewart et al. .............. 709/205 |
| 2002/0029378 | A1 | 3/2002 | Larsson |
| 2002/0069065 | A1 | 6/2002 | Schmid et al. |
| 2002/0131404 | A1 * | 9/2002 | Mehta et al. ................. 370/352 |
| 2002/0156909 | A1 * | 10/2002 | Harrington .................. 709/231 |
| 2003/0023695 | A1 * | 1/2003 | Kobata et al. ............... 709/206 |
| 2003/0226102 | A1 * | 12/2003 | Allor ........................ 715/501.1 |
| 2004/0068728 | A1 * | 4/2004 | Blevins ....................... 718/100 |

FOREIGN PATENT DOCUMENTS

| | | |
|---|---|---|
| EP | 1074911 A2 | 2/2001 |
| EP | 1 136 912 A2 | 9/2001 |
| EP | 1241905 A1 | 9/2002 |
| WO | 97/16938 | 5/1997 |
| WO | WO 98/19239 | 5/1998 |
| WO | WO 99/49394 | 9/1999 |
| WO | WO 00/08611 | 2/2000 |
| WO | WO 00/69084 | 11/2000 |
| WO | WO 00/72586 A2 | 11/2000 |
| WO | WO 01/14960 A2 | 3/2001 |
| WO | WO 01/41393 A2 | 6/2001 |
| WO | WO 01/50282 A1 | 7/2001 |
| WO | WO 01/51940 A1 | 7/2001 |
| WO | WO 01/88707 A2 | 11/2001 |
| WO | WO 02/27565 | 4/2002 |
| WO | WO 02/29824 | 4/2002 |
| WO | WO 02/33879 A2 | 4/2002 |
| WO | WO 02/35351 A1 | 5/2002 |
| WO | WO 02/054094 | 7/2002 |

OTHER PUBLICATIONS

Don Batory et al., "The Design and Implementation of Hierarchical Software Systems with Reusable Components" ACM Transactions on Software Engineering and Methodology, Association for Computing Machinery, New York, US, vol. 1, No. 4, Oct. 1, 1992, pp. 355-398.

Gabriele Goldacker et al., "Broadband-ISDN standardization—State of the art", Computer Standards and Interfaces, Elsevier Sequoia. Lausanne, CH, vol. 17, No. 1, 1995, pp. 55-62.

A Layered Approach to Building Open Aspect-Oriented Systems by Paniti netinant et al.; Communications of the AC; Oct. 2001; vol. 44, No. 10; pp. 83-85.

Aspect-Oriented Programming by Silvia Breu; pp. 1-22, PA, 2003.

Draft: Aspect-Design in the Building-Block Method by Jurgen K. Muller; Philips Research Laboratories; International Workshop on Aspect-Oriented Programming at ECOOP, 1992; 3 Pages.

A Version Model for Aspect Dependency Management by Elke Pulvermuller et al.; J. Bosh (Ed.): GCSE 2001, LNCS 2186, Springer-Verlag Berlin Heidelberg 2001, pp. 70-79.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages.

Design and Implementation of Java Application Environment and Software Platform for Mobile Phones, by Kazutoshi Usui, Hiroyuki Tomimori, Junji Takagi, Tomohisa Tanaka and Yukikazu Nakamoto; XP-001092568; Special Issue on IMT2000 Mobile Communication System; Oct. 2001; pp. 379-383.

Container-Managed Messaging: An Architecture for Integrating Java Components and Message-Oriented Applications by Ignacio Silva-Lepe, Christopher Codella, Peter Niblett, Donald Ferguson, Proceedings of the 37th International Conference on Technology of Object-Oriented Languages and Systems (Tools-Pacific 2000), Sydney, NSW, Australia, Nov. 20-23, 2000; pp. 228-241.

K. Moessner, et al., "Terminal Reconfigureability-The Optima Framework" 3G Mobile Communication Technologies, No. 477, XP002266662, Mar. 26-28, 2001, (pp. 241-246).

K. Moessner, et al., "Terminal Reconfigureability-The Software Download Aspect", 3G Mobile Communication Technologies, Conference Publication, No. 471, XP002266663, (pp. 326-330), IEEE 2000.

U.S. Appl. No. 10/359,911, filed Sep. 18, 2003, Lind et al.
U.S. Appl. No. 10/359,772, filed Sep. 25, 2003, Wilhelmsson et al.
U.S. Appl. No. 10/248,835, filed Dec. 4, 2003, Solve et al.
U.S. Appl. No. 10/666,673, filed Jul. 1, 2004, Hansson et al.
U.S. Appl. No. 10/664,618, filed May 20, 2004, Bjare et al.
U.S. Appl. No. 10/666,699, filed Jul. 1, 2004, Bjare et al.

Manuel Rodriguez-Martinez et al., "Automatic Deployment of Application-Specific Metadata and Code in MOCHA", Lecture Notes in Computer Science, Mar. 31, 2000 (pp. 69-85).

N.J. Drew et al., "Reconfigurable Mobile Communications: Compelling Needs and Technologies to Support Reconfigurable Terminals", IEEE International Symposium on Personal, Indoor and Mobile Radio Communications, PIMRC. Wireless: Merging onto the Information Superhighway. vol. 1, Sep. 18, 2000 (pp. 484-489).

Aspects & Crosscutting in Layered Middleware Systems by Lodewiik M.J. Bergmans et al.; Trese Group-Center for Telematics and Information Technology (CTIT); pp. 1-3, Apr. 2000.

Supporting the Design of Adaptable Operating Systems Using Aspect-Oriented Frameworks by Paniti Netinant et al.; International Conference on Parallel and Distributed Processing, Jun. 2000.

* cited by examiner

PLUG-IN MODEL

CROSS-REFERENCE TO RELATED APPLICATIONS

This application claims the benefit of priority from and incorporates by reference the entire disclosure of co-pending U.S. Provisional Patent Application Ser. No. 60/412,902, filed Sep. 23, 2002, currently expired. This application claims the benefit of priority from and incorporates by reference the entire disclosure of co-pending U.S. Provisional Patent Application Ser. No. 60/412,901, filed Sep. 23, 2002, currently expired. This application claims the benefit of priority from and incorporates by reference the entire disclosure of co-pending U.S. Provisional Patent Application Ser. No. 60/412,769, filed Sep. 23, 2002, currently expired. This application claims the benefit of priority from and incorporates by reference the entire disclosure of co-pending U.S. Provisional Patent Application Ser. No. 60/412,756, filed Sep. 23, 2002, currently expired. This patent application incorporates by reference the entire disclosure of U.S. patent application Ser. No. 10/359,772, which was filed on Feb. 7, 2003, issued on Aug. 19, 2008 as U.S. Pat. No. 7,415,270. This patent application incorporates by reference the entire disclosure of U.S. patent application Ser. No. 10/359,835, which was filed on Feb. 7, 2003, issue pending. This patent application incorporates by reference the entire disclosure of U.S. patent application Ser. No. 10/359,911, which was filed on Feb. 7, 2003, currently pending.

BACKGROUND OF THE INVENTION

1. Technical Field of the Invention

The present invention relates generally to the field of wireless telecommunications; more particularly, the present invention relates to a method and system for extending and modifying the functionality of a platform for a mobile terminal for a wireless telecommunications system, without modifying the base functionality.

2. Description of Related Art

A platform that provides a high degree of configurability is an attractive option for many manufacturers of end user mobile products and other platform customers. Configurability is especially important with respect to high level functionality in that some customers desire such functionality, and often prefer to develop such functionality in-house, while others have no interest in including such functionality in their products.

A mobile terminal platform that provides a high degree of configurability, however, introduces a number of difficulties for the provider of the platform. For example, the provider must support any high-level functionality that is added to the platform and support the numerous configurations that different customers might require, such as by providing customers with platform documentation that is specific for their particular configuration. Also, since not all configurations of a platform can be expected to operate properly, it becomes necessary for the platform provider to test each specific configuration to ensure that the added functionality works in a manner desired by the customer. In addition, in many cases, the added functionality will be dependent on and have logical dependencies towards other functionality that is provided in the platform, such that if the latter functionality is removed, the added functionality may no longer operate properly.

Furthermore, it is frequently the case that a platform provider wishes to maintain details of its platform proprietary. To achieve this, the platform provider should not expose the code base directly to a customer or to any other party. Instead, it is preferable that a customer views the platform simply as a "black box" having a defined interface and defined behavior.

A platform having a high degree of configurability, however, can present difficulties with respect to maintaining details of the platform proprietary. For example, it is a common practice for a platform provider to contract a third party to develop high level add-ons to a platform. The platform provider might develop applications for the platform that are delivered with the platform. A typical example where this might occur is with respect to product-specific functionality such as functionality that controls the look and feel of the user interface, which is often implemented as a high-level graphics library. Since the look and feel is brand-specific, this functionality will differ among products and brands.

If a third-party is contracted to develop high-level add-ons, however, that party will require access to the platform code base in order to develop the functionality, forcing the provider to reveal proprietary information to the third party.

In addition, after a platform has been configured and delivered to a customer, the functionality of the platform will have been tested, stabilized and fixed. The customer, however, may have additional requirements with respect to modifying, extending and configuring the platform that are precluded by the design of the delivered platform. For example, a customer might wish to modify various parts of the provided functionality to tailor the platform to particular needs or to add more powerful functionality than is included in a delivered platform, i.e., functionality that the platform provider considers to be outside the scope of the platform domain. In addition, a customer might want to configure the platform functionality on a more detailed level than is offered by the platform provider in the basic platform assembly configuration, or to perform some form of last minute configuration to add or remove functionality to the platform based on what an end user is prepared to pay.

In general, current platforms for mobile terminals and other products do not provide an effective procedure by which the functionality of the platform can be extended, removed, or otherwise changed.

SUMMARY OF THE INVENTION

The present invention provides a method and system by which the functionality of a platform for a mobile terminal for a wireless telecommunications system or for another product can be extended or otherwise changed. A system for extending and/or modifying functionality of a platform for a product includes a platform domain having a software services component for providing functionality and an interface component having at least one interface for providing access to the functionality of the software services component for enabling application domain software to be installed, loaded and run in said platform via said at least one interface. The system also includes plug-in software for use by the application software for extending and/or modifying the functionality of the software services component of the platform domain via the at least one interface.

A method for extending and/or modifying functionality of a platform for a product includes providing a platform domain having a software services component for providing functionality, and an interface component having at least one interface for providing access to the functionality of the software services component for enabling application domain software to be installed, loaded and run in said platform via said at least one interface. The method also includes providing plug-in software together with the application software for extending and/or modifying the functionality of the software services component of the platform domain via the at least one interface. The method also includes extending and/or modifying the functionality of the software services component via said plug-in software.

Further advantages and specific details of the present invention will become apparent hereinafter from the detailed description given below in conjunction with the following drawings.

DETAILED DESCRIPTION OF THE EXEMPLARY EMBODIMENTS OF THE INVENTION

Figure 1:
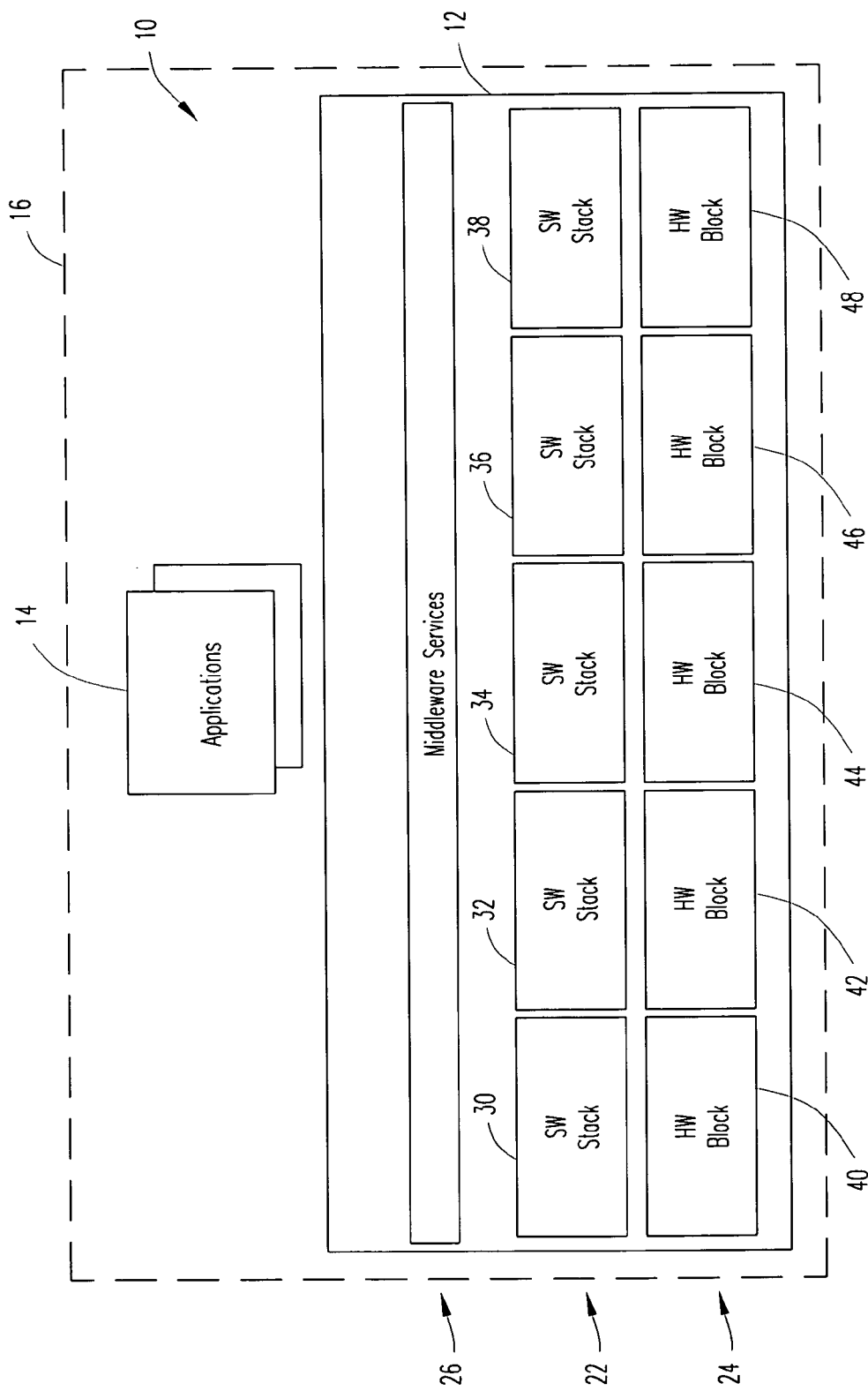
FIG. 1 is a block diagram that schematically illustrates a platform system for a mobile terminal for a wireless telecommunications system to assist in explaining principles of the present invention.

FIG. 1 is a block diagram that schematically illustrates a platform system for a mobile terminal for a wireless telecommunications system to assist in explaining principles of the present invention. The platform system is generally designated by reference number 10 and includes a mobile terminal platform assembly 12 and one or more applications (i.e., application software) 14 that have been installed, loaded and run in the mobile terminal platform assembly. Platform system 10 is adapted to be incorporated in a mobile terminal generally designated by dotted line 16. Mobile terminal platform assembly 12 includes a software services component 22, a hardware component 24, and an interface component 26. Software services component 22 includes a plurality of well-structured functional software units for providing services that are offered to users via the interface component 26. In the exemplary system 10 illustrated in FIG. 1, the plurality of software units include a plurality of vertically-oriented functional software stacks 30-38.

In the exemplary system 10 illustrated in FIG. 1, the hardware component 24 includes a set of hardware blocks 40-48 that are associated with and controlled by their respective functional software stacks 30-38. The interface component 26 includes a middleware services layer that includes at least one application programming interface (API) for installing, loading and running one or more applications 14 in mobile terminal platform assembly 12, that isolates the mobile terminal platform assembly 12 from the applications 14 using the mobile terminal platform assembly 12, and that provides various other services for the applications 14.

Mobile terminal platform assembly 12 of platform system 10 is adapted to be designed, implemented (assembled) and tested as a complete, enclosed unit separate from the application software 14 (the term "application software" as used herein can be any software that provides the functionality that users may wish to have available). Users can, accordingly, develop or otherwise acquire their own application software and add that software to the mobile terminal platform assembly 12 at a later time in order to complete platform system 10. Mobile terminal platform assembly 12 can, accordingly, be sold or otherwise transferred to a plurality of different users each of which can complete platform system 10 by installing, loading and running their own application software in the assembly in order to satisfy their own particular requirements for the platform system.

Figure 2:
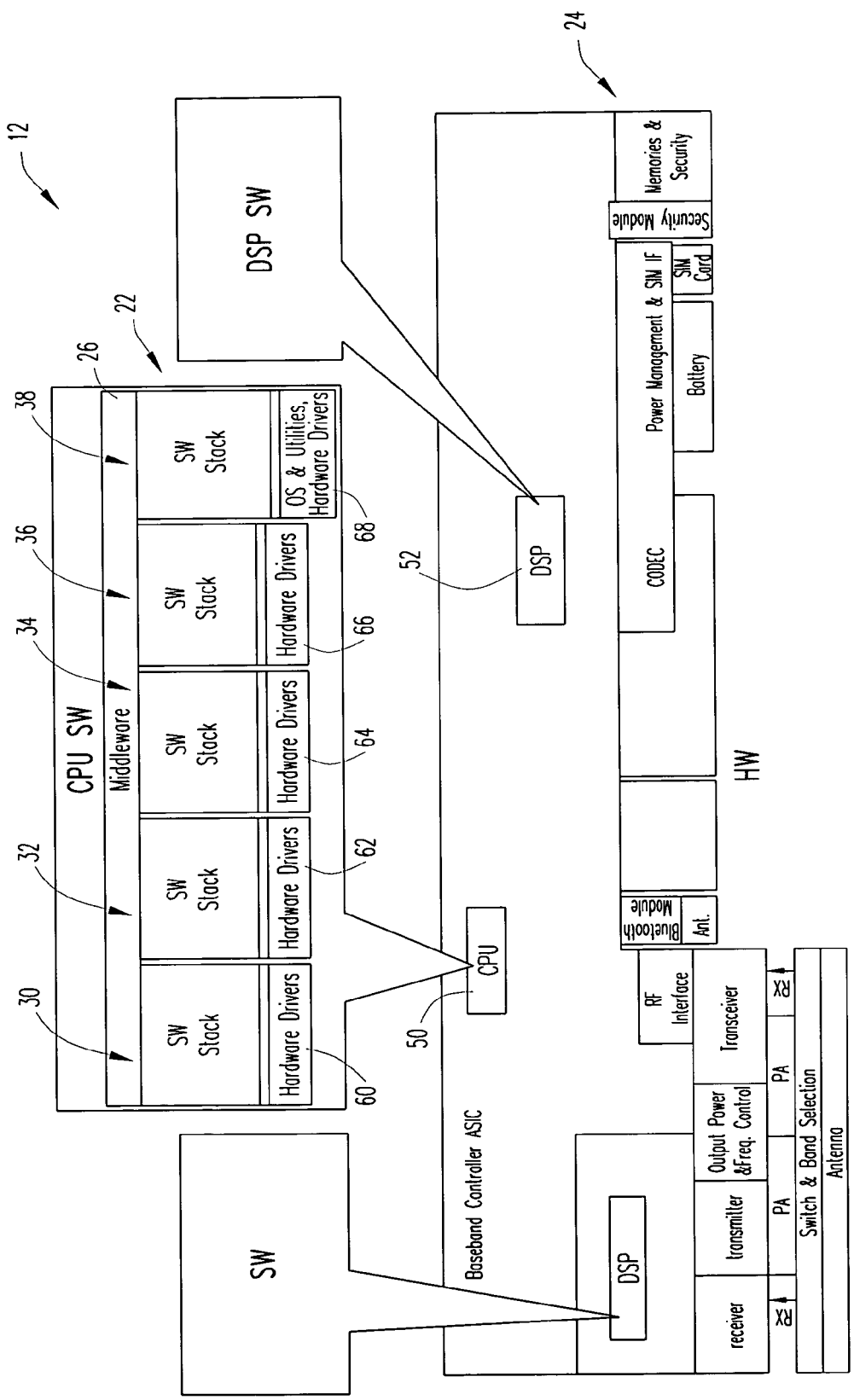
FIG. 2 is a block diagram that schematically illustrates a deployment view of the mobile terminal platform assembly of the platform system of FIG. 1 to further assist in explaining principles of the present invention.

FIG. 2 is a block diagram that schematically illustrates one example of a deployment view of mobile terminal platform system 12 of FIG. 1 to further assist in understanding principles of the present invention. As illustrated in FIG. 2, mobile terminal platform assembly 12 is controlled via software executing in a main CPU 50. The main CPU 50 may include one or more processors such as microprocessors, micro programmable processors or DSPs (Digital Signal Processors). The software stacks 30-38 of software component 22 each include hardware driver software 60-68 to operate the hardware units associated with each stack. Further details of the mobile terminal platform assembly 12 and platform system 10 are given in commonly assigned U.S. patent application Ser. No. 10/359,835, the disclosure of which is hereby incorporated by reference.

Figure 3:
FIG. 3 is a block diagram that schematically illustrates the software architecture of the mobile terminal platform assembly of FIGS. 1 and 2 to further assist in explaining principles of the present invention.

The software incorporated in mobile terminal platform assembly 12 is preferably arranged in such a manner as to make the software organization easy to understand so that it can be more easily designed and more easily upgraded or otherwise modified. FIG. 3 is a block diagram that schematically illustrates the software architecture of mobile terminal platform assembly 12 to further assist in explaining principles of the present invention.

As shown in FIG. 3, software services component 22, in addition to being organized into a plurality of vertical, functional software stacks as described above, is also arranged to define a plurality of horizontal layers such that the software of the middleware services layer and the software of the software services component 22 together define a layered architecture, generally designated by reference number 70, in which the layers are arranged in descending order from a higher level service layer to a lower level service layer.

The software architecture differs from the standard ISO/OSI (ISO Open Systems Interconnection) model in that it includes a plurality of horizontally partitioned functional software units that complement a plurality of vertically partitioned software layers. The horizontal partitioning contributes significantly to the creation of independent modular (service) components.

The highest layer of the layered architecture is the middleware services layer, which is part of the interface component 26. The layers of the software services component 22 include an application service layer 80 to provide application services, a platform services layer 82 to provide platform specific services for applications, a platform protocol layer 84 to provide session protocols and application specific protocols, a transport layer 86 to provide audio access/control, datacom transport protocols, messaging transport protocols and the like, a data access layer 88 to provide external data IF access, structured storage services and other low level platform support services, a logical drivers layer 90 and a physical drivers layer 92 encapsulating hardware dependencies. In addition, software services component 22 includes basic system services layers 94 that provide general services that are needed by the platform assembly 12.

The bottom two layers 90 and 92 constitute Hardware Abstraction Layers (HAL) which isolate the dependencies between the software and the hardware. Only the physical drivers layer is concerned with the details of the hardware (i.e., which registers in the ASIC hardware are addressed). The logical drivers layer 90 provides a logical mapping to the hardware, i.e., this layer provides a bridge between the hardware and software parts of the mobile terminal platform assembly.

The software itself is organized into a plurality of software modules, modules 102, 104, 106 being specifically indicated in FIG. 3. In software services component 22, a single module can reside in only one vertical functional stack and in only one horizontal layer within that stack. Each layer can contain from one to many modules, and all the modules in a particular layer in a particular stack have the same level of abstraction. Communication among the various modules is accomplished via a Software Back Plane (SwBP) 112 subject to a set of basic rules for software module-to-module access. These rules can be summarized as follows:

A software module may invoke functionality in all layer interfaces below its own layer.

There are no limitations for the direction of serialized data flows holding e.g. event information or data streams. They may go in any direction.

A software module may never invoke functionality in layer interfaces (in the SwBP 112) above its own layer, independent of to which module the layers belong.

A software module may invoke functionality in the layer interface in its own layer in the same vertical stack.

A software module may invoke functionality in a software module in the same layer in another vertical stack. (This capability is permitted to limit the number of layers in the vertical stacks.)

There is no hard coupling between the various modules and the interfaces in the SwBP 112. As a result, the modules and/or the implementation of the interfaces can be freely changed without any impact on the clients to the interfaces. This capability permits individual modules to be added, removed or changed without affecting other modules in the platform assembly. Further details of the layered architecture, including the SwBP software structure that enables the internal communication between modules within the mobile terminal platform assembly are described in commonly assigned, U.S. patent application Ser. No. 10/359,911, the disclosure of which is hereby incorporated by reference.

Middleware services layer functions to provide a well-defined interface between the software in the mobile terminal platform assembly 12 and the application software 14 to be installed, loaded and run in the platform assembly 12; and, in addition, encapsulates the mobile terminal platform assembly 12 and isolates the assembly 12 from applications via the middleware services layer, and provides various other services for the applications 14.

Figure 4A:
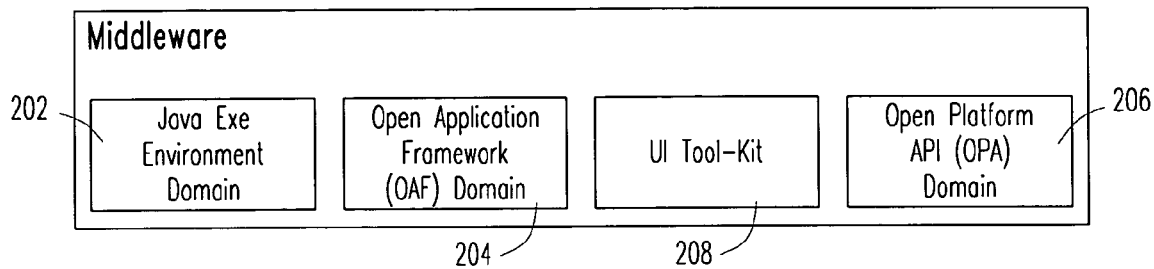
FIG. 4A is a logical block diagram that schematically illustrates details of the middleware services layer of FIGS. 1-3.

FIG. 4A is a logical block diagram that schematically illustrates details of the middleware services layer of the interface component 26. As shown in FIG. 4A, middleware services layer includes a plurality of API domains including non-native environments e.g. Java Execution (Java ExE) Environment domain 202, Open Application Framework (OAF) domain 204, Open Platform API (OPA) domain 206 and UI Tool-kit domain 208.

Through the APIs in the middleware services layer, the mobile terminal platform assembly 12 supports a plurality of application environments. In the exemplary embodiment of FIG. 4A, middleware services layer supports environments for native applications (applications that are compiled to run with a particular processor and its set of instructions) and for non-native applications such as Java J2ME CLDC/MIDP (Java 2 Micro Edition Connected Limited Device Configuration/Mobile Information Device Profile) applications. Each execution environment has its own characteristics and is defined as:

The way applications are developed (programming language support, compilation and linkage).

The way applications are executed (e.g., interpretation or native code execution)

The functional services that are offered.

Potential restrictions in use.

By providing multiple application environment alternatives, a wide range of products with varying demands such as cost, ease of use, time to market, functionality set, size, portability, etc. is facilitated. Each of the API domains includes a plurality of software modules, and details of various of the domains are described in commonly assigned U.S. patent application Ser. No. 10/359,772, now issued as U.S. Pat. No. 7,415,270, the disclosure of which is hereby incorporated by reference.

Figure 4B:
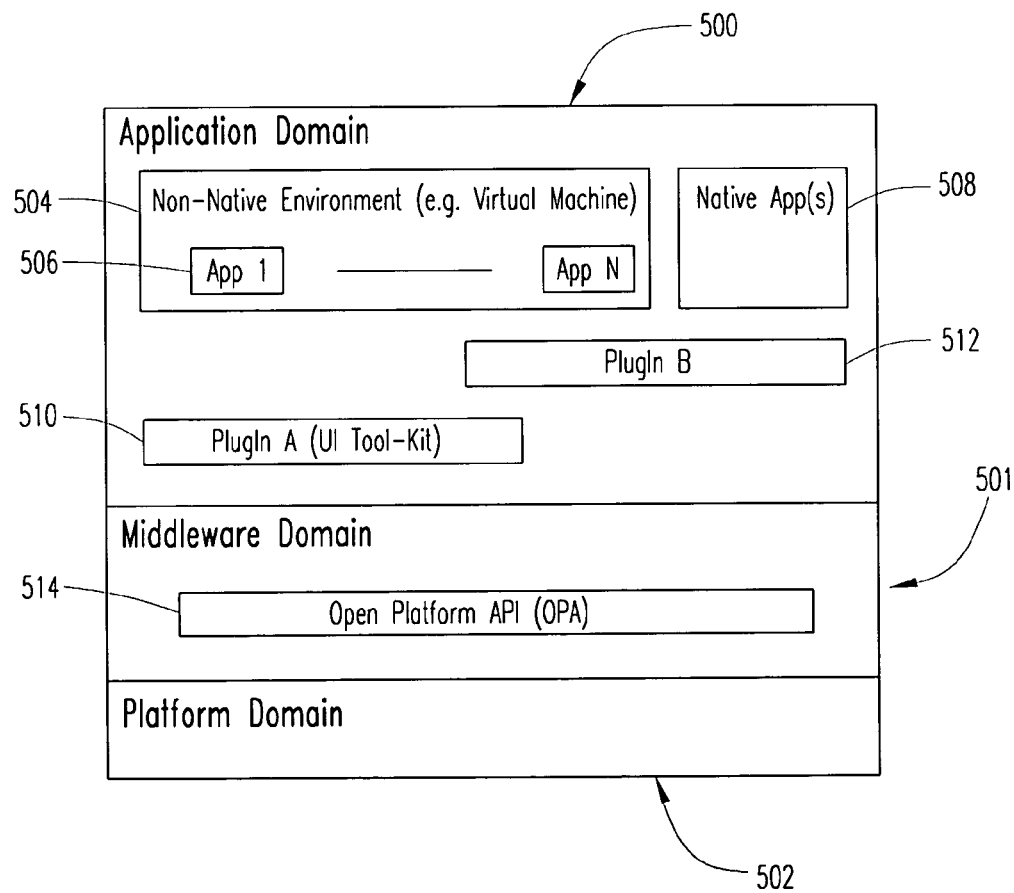
FIG. 4B is an implementation view of the block diagram of FIG. 4A.

FIG. 4B is an implementation view of an Application domain 500 and a Middleware domain 501. It illustrates two Plugins, Plugin A 510 and Plugin B 512, both of which reside in the Application domain 500 in order to extend and/or modify the services of an Open Platform API 514 of the Middleware domain 501. The Plugin A 510 may depend on the Open Platform API 514 only, while the Plugin B 512 may depend on the Plugin A 510 as well as the Open Platform API 514. Both native applications 508 and non-native applications 506 may depend on the Plugin A 510, on the Plugin B 512, as well as on the Open Platform API (OPA) 514. In case of a non-native environment (e.g., a Java Virtual Machine), the application dependency is indirect, in the sense that the applications 506 depend on a non-native environment 504. The non-native environment 504 depends on the Plugin A 512, the Plugin B 514 or on the Open Platform API 514.

Figure 5:
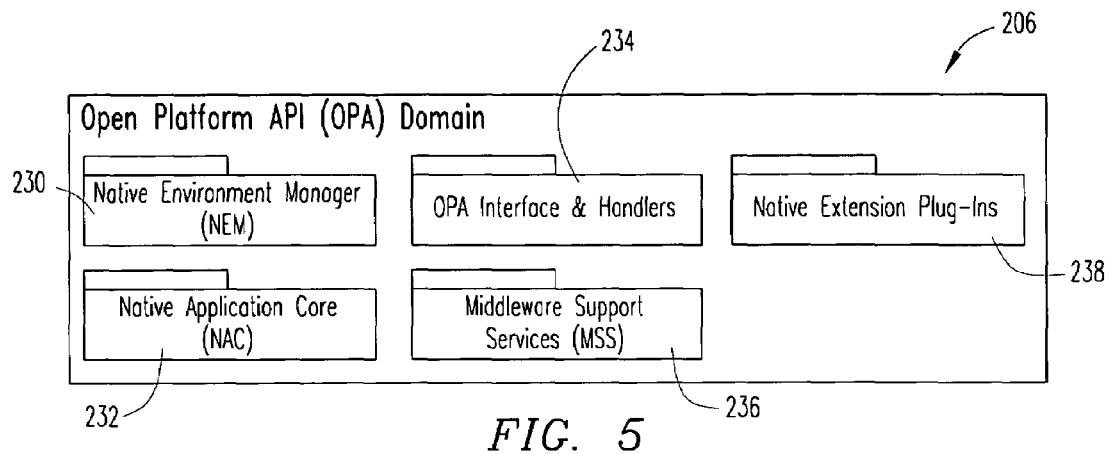
FIG. 5 is a block diagram that schematically illustrates major software modules of the Open Platform API (OPA) domain.

FIG. 5 is a block diagram that schematically illustrates the major software modules of the Open Platform API (OPA) domain 206 according to an exemplary embodiment of the present invention. As illustrated, the OPA domain 206 includes five modules: a Native Environment Management (NEM) module 230, a Native Application Core (NAC) module 232, an OPA Interface and Handlers module 234, a Middleware Support Services module 236 and a Native Extension plug-in module(s) 238.

The Native Environment Management module 230 has the responsibility of controlling native applications in platform system 10. It is the recipient of the control commands concerning native applications, and keeps track of native applications that are currently running in the system.

The Native Application Core module 232 administers and takes care of the threading and message-handling complexities that the applications would otherwise have to handle themselves. The NAC module 232 also serves the purpose of achieving OS independence by simplifying the implementation details of the OS for relieving applications from run-time complexities, including message routing/filtering and message-related resource handling. Yet another important responsibility of the Native Application Core is to simplify the details of the start-up and shutdown phase of an application and in the handling of messages.

The Middleware Support Services module 236 provides services to the OPA domain that are common for the different handlers or that need to be centralized, e.g., object management and resource supervision.

The Native Extension plug-in module(s) 238 provides a flexible extension possibility for the provider of platform assembly 12. The plug-in, in effect extends the functionality of the platform assembly by providing additional interfaces and additional services to the application software 14 written by an end user equipment manufacturer or another party.

Figure 6A:
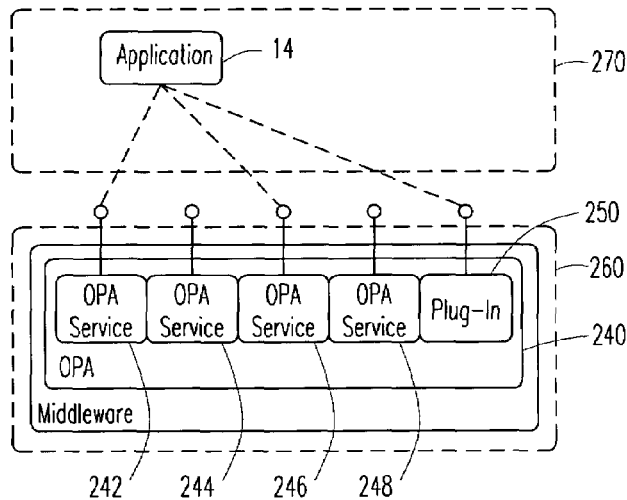
FIGS. 6A and 6B are block diagrams that schematically illustrate logical and implementation views, respectively, of an Open Platform API (OPA) domain.

While FIG. 5 is a logical view that illustrates the plug-in as a module of the Open Platform API (OPA) domain 206, FIG. 6A is a logical view illustrating a more general representation of an Open Platform API (OPA) domain 240 having a plurality of Open Platform API modules 242, 244, 246 and 248, and a plug-in module 250 according to another exemplary embodiment of the present invention. In this logical view, plug-in 250 is also shown as being incorporated in Open Platform API 240 because, from the viewpoint of a customer, plug-in 250 will behave and appear as part of the Open Platform API in the middleware services component 260 of the platform assembly. In actuality, however, plug-in 250 includes a stand-alone entity running in the application software domain 270 on top of platform assembly 12, and that uses the functionality that is provided by the platform assembly. Thus, from an implementation point of view, it is located above the platform assembly, using the Open Platform API to access the platform assembly functionality as illustrated in the implementation view of FIG. 6B The plug-in supports all of the application software mechanisms supported by the platform assembly, and complies with the application model defined in the platform assembly. In other words, the plug-in will adhere to the same paradigm(s) as the provided OPA services exported by the Open Platform API. These include, but are not limited to:

Component model compliance in terms of how interfaces and components are defined and operate. The plug-in is implemented as a component and will provide its services to end-product application software through a defined function or method based interface.

Naming convention compliance. The plug-in uses the same naming convention for the interface methods as the Open Platform API. Also both the parameters and types defined in these interface methods will comply with the naming conventions used in the Open Platform API.

Undesired-event handling compliance. The plug-in will handle possible erroneous behavior of the functionality in the same way as the platform. Information about such errors will be delivered to the application software according to the same paradigm as in the Open Platform API.

Message model compliance. The plug-in will support two modes for delivering results from asynchronous requests, call back, and full message mode services.

object and interface based paradigm

With respect to the next-to-last point mentioned above, message model compliance has a major effect on the behavior of the plug-in and on how the plug-in is constructed. In particular, the platform assembly message model offers dual modes for the application software for the purpose of receiving results from asynchronous service requests and resulting from event subscriptions. The dual modes imply that the result is received, either via a callback mechanism (callback mode), or via a message queue (full message mode). This provides a flexibility and freedom for the platform assembly customer software developer to structure different applications according to different message models, depending on the nature of the application functionality.

The application determines the message mode in which the application will receive an asynchronous result by executing, or not executing, a return statement. If the application decides to receive the result in callback mode, the application returns execution control after having completed an asynchronous service request. If the decision is to go for the full message mode, the application does not return execution control after the service request, but rather polls the message queue and invoke the message-handling code manually by itself. Another benefit of this solution is that an application may actually change between the callback and full message mode at any point in runtime, in case this is needed or desirable for a certain problem or context.

Figure 7A:
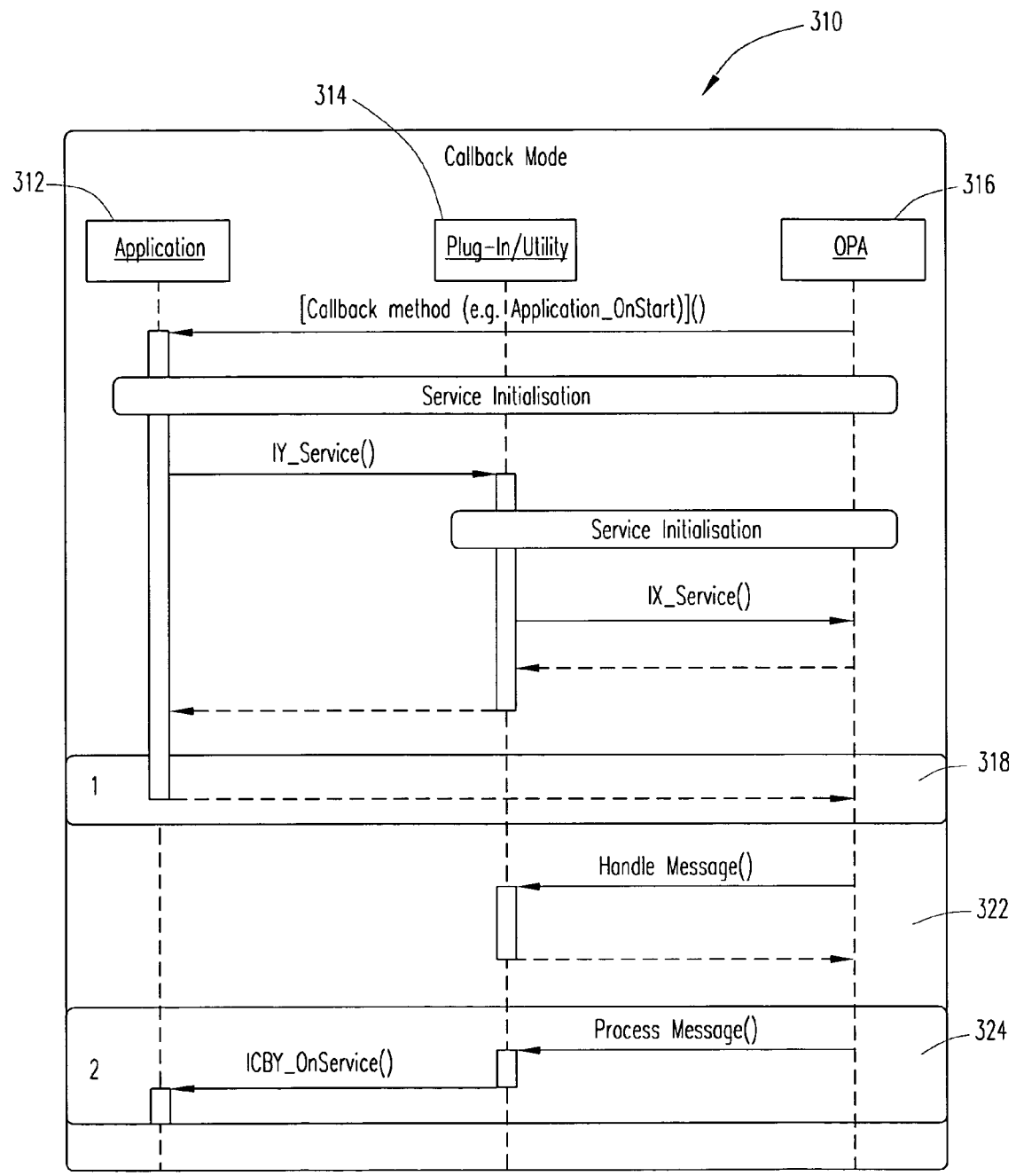
FIGS. 7A and 7B are diagrams that schematically illustrate sequences for a plug-in model to accomplish message model compliance in a callback mode and a full message mode, respectively.
Figure 7B:
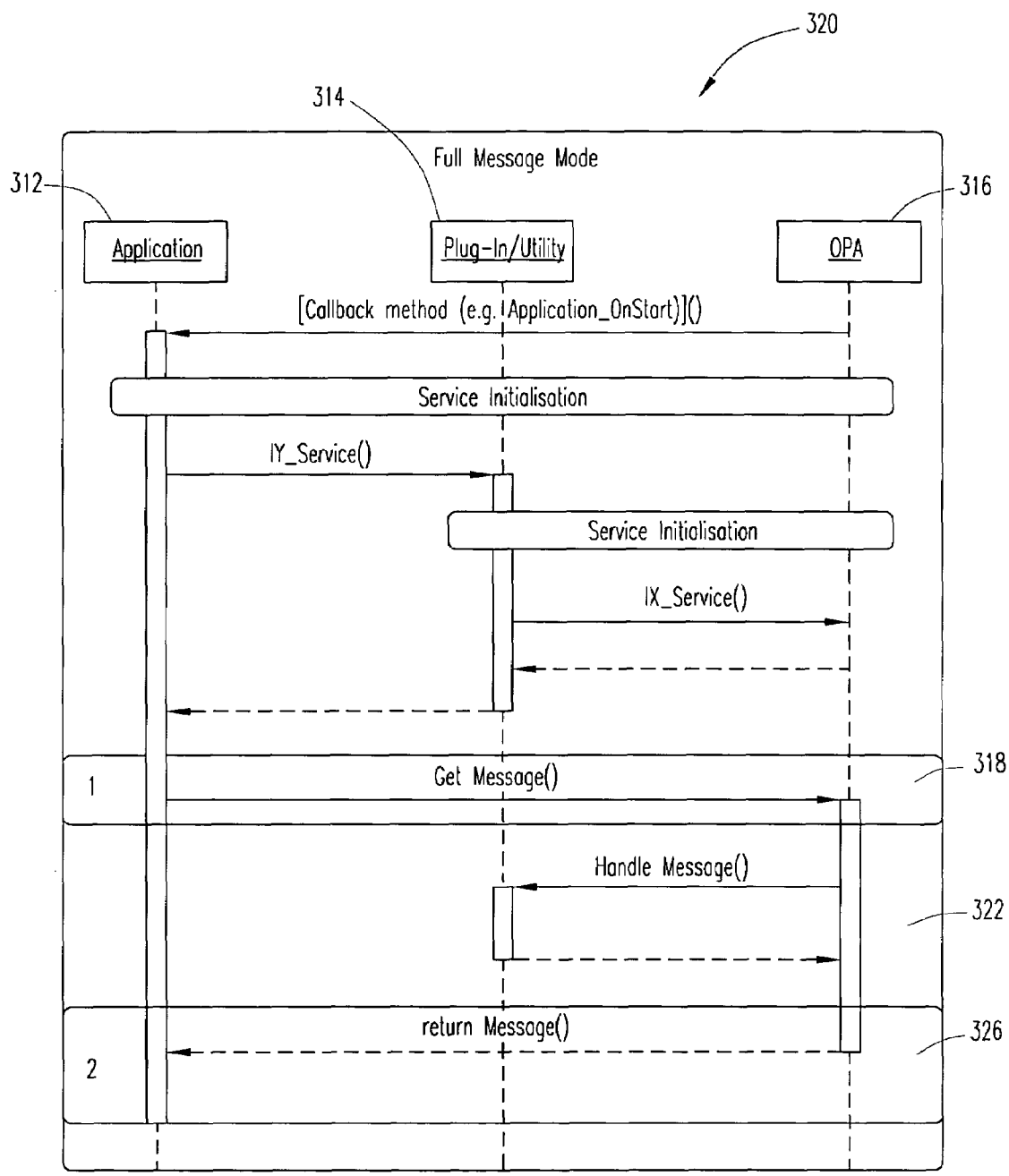

The plug-in model complies with the dual modes of the message model, and will provide this flexibility transparently to the customer's application software. The sequence for accomplishing this compliance, according to an exemplary embodiment of the present invention, is schematically illustrated in FIG. 7A, which schematically illustrates the sequence 310 for the callback mode, and in FIG. 7B, which schematically illustrates the sequence 320 for the full message mode. The sequence charts present the interaction between the Open Platform API (OPA) 316, a Plug-In (or Utility) 314 and the Application 312 requesting a service.

1. The client application will receive the execution control from OPA at start up. It might also optionally be required to initialize the plug-in service according to the same paradigms that is used for initializing the OPA services (the platform assembly functionality). When the plug-in interface "IY" is called (i.e. a service from the Plugin is requested by the application), the plug-in will rely on one or several OPA service interfaces "IX" to carry out the task. As noted in FIGS. 7A and 7B, these service request steps are identical for both the callback mode and the full message mode.
2. Depending on how the customer application would like to receive the result, it either returns execution control to OPA (callback mode 310) or polls for messages via full message mode 320 as indicated by 318 in FIGS. 7A and 7B.
3. The platform assembly knows that the service "IX" is carried out for a plug-in and will return the result to the plug-in by invoking a Plugin method e.g. the Handle Message method according to 322. The plug-in will convert the result from the platform assembly into a message format as indicated in FIG. 7A and return this message to the platform assembly represented by OPA 316 in this case. Note that this step might be omitted if the application has indicated to the plug-in that it only wants to receive messages in callback mode, which will speed up the handling and delivery of the result. The platform assembly is aware of the message mode in which the application waits for the result and will return the result accordingly. Depending on which mode that is active, at least two scenarios are possible:
   If the application is in callback mode 310 according to FIG. 7A, the result will be given in the callback method "ICBY_OnService". In this case the plug-in will process and format the result so it can be returned via the stack using a procedure call.
   If the application is in full message mode 320 according to FIG. 7B, the result will be delivered using the message created by the plug-in in step Handle_Message 322. When the plug-in returns the result in message format to OPA 316, OPA will in turn return control from Get_Message to the application 312, thereby delivering the result.

With the plug-in model according to principles of the present invention, the issues described above with respect to changing the functionality of a mobile terminal platform are overcome. For example, by using OPA plug-ins for the implementation of higher level functionality, the platform provider can offer a slimmer and more stable platform, which still includes the basic and/or default platform functionality that is considered to cover the needs of end user products. This brings the administration of the higher level functionality closer to the application domain and to manufacturers of end-user products and other customers, since the non-standard add-on functionality is provided as a plug-in, which can be easily added/removed depending on the specific product concerned.

In addition, with embodiments of the present invention, third party developers are able to implement add-on functionality as one or several plug-ins, without it being necessary to reveal proprietary information relating to the platform code base to third party developers or others. In particular, since the plug-in is an entity of the application domain software, a third party developer can choose to use only the default/basic platform API.

By exploiting the plug-in technique as described above, a provider of the platform assembly can choose to expose only a controlled and dedicated fraction of the code base to a customer, i.e., one or several of the stand alone plug-ins. The provider may, for example, choose to provide the plug-in as source code to the customer, who can then change and modify the code of the plug-in in order to tailor the functionality and behavior of the plug-in.

By supplying a plurality of plug-ins with a higher level of functionality, it is easy for an end user product manufacturer or other party to extend the functionality of the platform assembly. It is also possible for a platform provider to deliver manufacturer-specific extensions to the platform assembly that is not considered to be part of the basic functionality offering of the platform assembly.

By supplying a plurality of plug-ins with extended functionality, it is also easy to perform a "last minute" configuration of the platform assembly, e.g., to tailor the platform assembly to different needs arising from different products, or to customize the end-user product at the time of purchase. With embodiments of the present invention, it will be easy for end user manufacturers using the platform assembly to make late decisions about whether to use platform provider plug-ins or to develop functionality in-house.

As mentioned above, one example where a higher level functionality of a product platform might be desired is with respect to product-specific functionality such as functionality that controls the look and feel of a user interface. For mobile terminals and other specialized consumer products with advanced user interfaces, the look and feel of the user interface is an important key to differentiation and positioning of the products in the marketplace; and, consequently, is important to commercial success. It is, accordingly, desirable that a platform for mobile terminals and other products provide a great deal of freedom in defining the look and feel of the products.

The separation of a windowing system core from the definition of look and feel is a proven and widely-used concept. The X window system exhibits this, and there are various examples of how systems with very different look and feel can be built on top of the same windowing system using this type of architecture. On the other hand, the ability to alter the look and feel of a given implementation is limited.

Porting of a Java VM is traditionally done at a low level of UI support. The look and feel is, to a high degree, defined by the implementation of graphical objects in Java. The introduction of MIDP (Mobile Information Device Profile) suggests another approach, where graphical objects are only defined at an abstract level. The look and feel is defined by the underlying system on which the VM is executing. If look and feel conformance between Java applications and other applications, executing outside the Java VM, is to be achieved, the same set of graphical objects can be used for both. This is straightforward for a system with a defined look and feel.

A Java VM in a mobile device ideally relies on the platform on which it is running to provide UI support according to the MIDP specification. This means that for a mobile platform including a Java VM, the MIDP support should also be part of the platform. On the other hand, for a platform intended for highly profiled consumer products from different vendors, it is important to provide the highest possible level of control over look and feel. Clearly, the highest level of control is achieved through control of the definition of the graphical objects. These two conflicting requirements on the platform cannot be satisfied with the previously described approaches.

In accordance with a further exemplary embodiment of the present invention, however, a set of graphical objects and utilities are defined as one or more plug-ins in the Open Platform API (OPA). The interfaces to the one or more plug-ins have to be fixed and sufficient for MIDP support, but the implementation may be altered freely.

In accordance with principles of the invention, the implementation of high level graphical objects and utilities can be shared between native applications and execution environments like Java. At the same time, the platform customer's control of the appearance and behavior of the graphical user interface is very high.

While what has been described constitute exemplary embodiments of the invention, it should be understood that the invention can be varied in many ways without departing from the scope thereof. For example, although the present invention has been described primarily in connection with a particular mobile terminal platform assembly, it is not intended to so limit the invention as the invention may also be used in other platforms for mobile terminals and other products. Because the invention can be varied in many ways, it should be recognized that the invention should be limited only insofar as is required by the scope of the following claims.

What is claimed:

1. A mobile terminal for use in a wireless telecommunications system, comprising:
   a mobile terminal having a mobile terminal platform comprised of a processor and a computer readable medium supporting a mobile terminal platform domain;
   the mobile terminal platform domain supported by a software services component for providing platform functionality in the form of open platform API (OPA) services, said software services component in the form of software instructions adapted to be loaded and stored in the computer readable medium and executed by the processor of the mobile terminal;
   the mobile terminal platform domain further having an interface component having at least one interface for providing access to the platform functionality of the software services component for enabling an application domain software to be installed, loaded and run in said mobile terminal platform domain via said at least one interface, said interface component in the form of software instructions adapted to be loaded and stored in the computer readable medium and executed by the processor; and plug-in software in the form of software instructions adapted to be loaded and stored in the computer readable medium and executed by the processor of the mobile terminal for use by the application domain software for extending the platform functionality of the software services component via the at least one interface, wherein said plug-in software adheres to the same paradigm as the platform functionality by supporting application software mechanisms supported by the mobile terminal platform; complying with an application model defined in the mobile terminal platform; and is implemented as a component wherein it provides its services to the application domain software through a defined function or method based interface, such services including one or more of component model compliance, naming convention compliance, undesired-event handling compliance and message model compliance.

2. The mobile terminal according to claim 1, wherein said at least one interface comprises an application programming interface.

3. The mobile terminal according to claim 1, wherein said plug-in software comprises software residing in a domain of said application software and uses the functionality of at least one of the platform domain and other plug-in software.

4. The method according to claim 1, wherein the message model includes a callback mode and a full message mode.

5. The mobile terminal according to claim 1, wherein said plug-in software includes a plurality of plug-in software modules.

6. The mobile terminal according to claim 1, wherein said plug-in software includes plug-in software defining a set of graphical objects and utilities for defining a look and feel of said platform.

7. The mobile terminal according to claim 1, wherein said platform domain comprises a platform for a mobile terminal for a wireless telecommunications system.

8. A method for use in a mobile terminal, comprising:
providing a mobile terminal having a mobile terminal platform comprised of a processor and a computer readable medium supporting a mobile terminal platform domain, the mobile terminal platform domain supported by a software services component for providing platform functionality, in the form of open platform API (OPA) services, said software services component in the form of software instructions adapted to be loaded and stored in the computer readable medium and executed by the processor in the mobile terminal;

providing an interface component in said mobile terminal platform domain having at least one interface for providing access to the platform functionality of the software services component for enabling an application domain software to be installed, loaded and run in said mobile terminal platform via said at least one interface, said interface component in the form of software instructions adapted to be loaded and stored in a computer readable medium and executed by the processor of the mobile terminal;

providing plug-in software in the form of software instructions adapted to be loaded and stored in the computer readable medium and executed by the processor of the mobile terminal and together with the application software for extending the platform functionality of the software services component of the mobile terminal platform domain via the at least one interface, wherein said at least one interface comprises an application programming interface, and wherein said plug-in software adheres to the same paradigm as the platform functionality by supporting application software mechanisms supported by the mobile terminal platform; complying with an application model defined in the mobile terminal platform; and is implemented as a component wherein it provides its services to the application domain software through a defined function or method based interface, the services including one or more of component model compliance, naming convention compliance, exception handling compliance and message model compliance.

9. The method according to claim 8, wherein said plug-in software comprises software residing in a domain of said application software and that uses the functionality of the platform domain.

10. The method according to claim 8, wherein the message model includes a callback mode and a full message mode.

11. The method according to claim 8, wherein said plug-in software includes plug-in software defining a set of graphical objects and utilities for defining a look and feel of said platform, and wherein said step of extending the functionality includes changing the look and feel of said platform.

12. The method according to claim 8, wherein said step of extending the functionality is performed by a customer of a provider of said platform.

13. The method according to claim 12, wherein said step of extending the functionality is performed by an end user product manufacturer.

14. The method according to claim 8, wherein said step of extending the functionality is performed by a third party contracted to change the functionality.

15. The method according to claim 8, wherein said step of extending the functionality comprises adding or modifying functionality to said software services component of said platform.

16. The method according to claim 8, wherein said platform domain comprises a platform for a mobile terminal for a wireless telecommunications system.

17. The method according to claim 8, wherein said step of extending the functionality is performed by downloading an application.

18. The method according to claim 8, wherein said step of extending the functionality is performed by downloading at least one plug-in.

* * * * *

UNITED STATES PATENT AND TRADEMARK OFFICE
CERTIFICATE OF CORRECTION

PATENT NO. : 7,584,471 B2
APPLICATION NO. : 10/665834
DATED : September 1, 2009
INVENTOR(S) : Bjare et al.

It is certified that error appears in the above-identified patent and that said Letters Patent is hereby corrected as shown below:

On the Title Page, Item (56), under "OTHER PUBLICATIONS", Line 1, delete "May 27, 2004," and insert -- June 26, 2003, --, therefor.

On Page 2, Item (56), under "OTHER PUBLICATIONS", Line 30, delete "Proceedigns" and insert -- Proceedings --, therefor.

On Page 2, Item (56), under "OTHER PUBLICATIONS", Line 40, delete "Sep. 18, 2003," and insert -- Feb. 7, 2003, --, therefor.

On Page 2, Item (56), under "OTHER PUBLICATIONS", Line 41, delete "Sep. 25, 2003," and insert -- Feb. 7, 2003, --, therefor.

On Page 2, Item (56), under "OTHER PUBLICATIONS", Line 42, delete "10/248,835, filed Dec. 4, 2003," and insert -- 10/359,835, filed Feb. 7, 2003, --, therefor.

On Page 2, Item (56), under "OTHER PUBLICATIONS", Line 43, delete "Jul. 1, 2004," and insert -- Sep. 19, 2003, --, therefor.

On Page 2, Item (56), under "OTHER PUBLICATIONS", Line 44, delete "May 20, 2004," and insert -- Sep. 19, 2003, --, therefor.

On Page 2, Item (56), under "OTHER PUBLICATIONS", Line 45, delete "Jul. 1, 2004," and insert -- Sep. 19, 2003, --, therefor.

On Page 2, Item (56), under "OTHER PUBLICATIONS", Line 59, delete "Processing, Jun. 2000." and insert -- Processing Techniques and Applications (PDPTA 2000); Las Vegas, Nevada; June 28-29, 2000; 7 pages. --, therefor.

In Column 6, Line 19, after "execution)" insert -- . --.

Figure 6B:
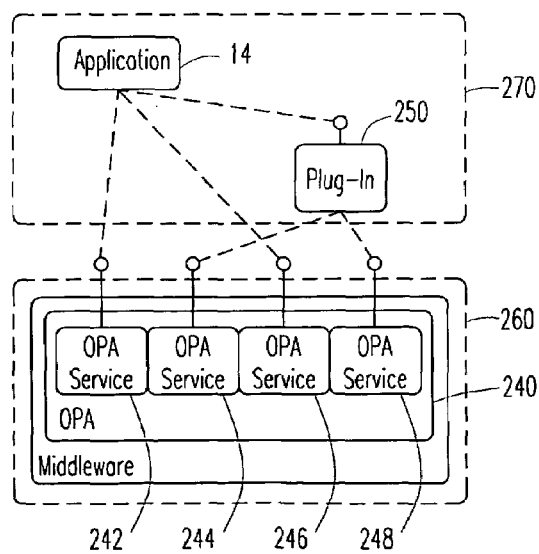

In Column 7, Line 33, after "FIG. 6B" insert -- . --.

In Column 7, Line 59, after "paradigm" insert -- . --.

UNITED STATES PATENT AND TRADEMARK OFFICE
CERTIFICATE OF CORRECTION

PATENT NO.         : 7,584,471 B2
APPLICATION NO. : 10/665834
DATED                  : September 1, 2009
INVENTOR(S)       : Bjare et al.

It is certified that error appears in the above-identified patent and that said Letters Patent is hereby corrected as shown below:

In Column 11, Line 30, in Claim 4, delete "The method according to claim 1," and insert -- The mobile terminal according to claim 1, --, therefor.

Signed and Sealed this

Seventeenth Day of November, 2009

David J. Kappos
*Director of the United States Patent and Trademark Office*